June 21, 1960
G. E. WEIBEL
2,942,144
WAVE GENERATOR
Filed Feb. 12, 1957
2 Sheets-Sheet 1
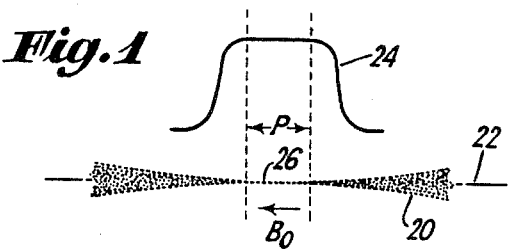
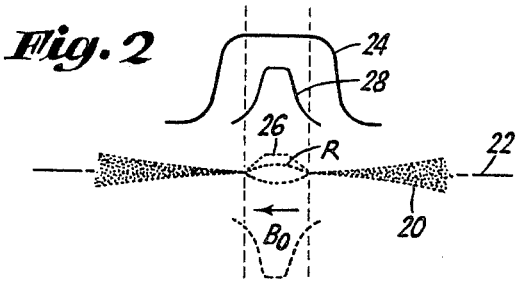
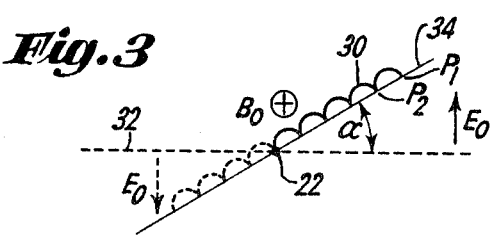
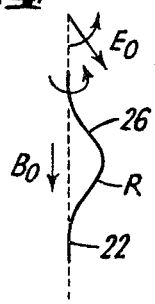
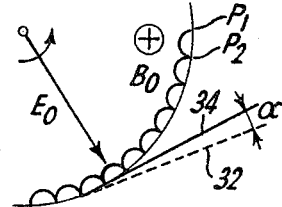
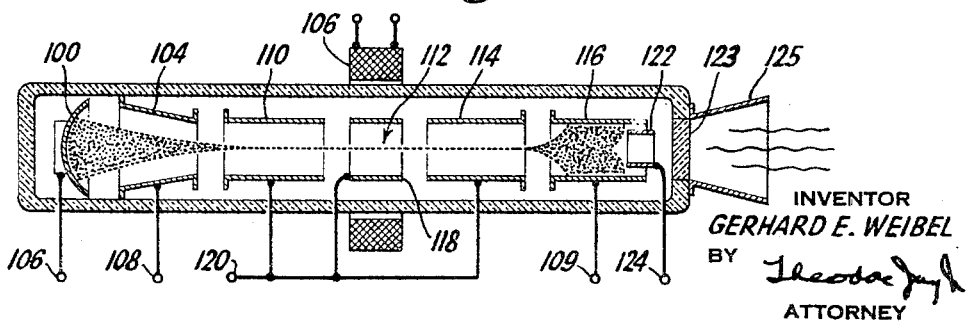
INVENTOR
GERHARD E. WEIBEL
BY
ATTORNEY June 21, 1960 G. E. WEIBEL 2,942,144
WAVE GENERATOR
Filed Feb. 12, 1957 2 Sheets-Sheet 2

INVENTOR
GERHARD E. WEIBEL
BY
ATTORNEY

United States Patent Office 2,942,14[4]
Patented June 21, 196[0]

2,942,144
WAVE GENERATOR

Gerhard E. Weibel, Manhasset, N.Y., assignor, by mesne assignments, to Sylvania Electric Products Inc., Wilmington, Del., a corporation of Delaware Filed Feb. 12, 1957, Ser. No. 639,814

4 Claims. (Cl. 315—7)

My invention is directed toward wave generators.

In the electronic arts it has become necessary to generate, at relatively high power levels, electromagnetic waves at wavelengths shorter than a centimeter; i.e. millimeter and submillimeter waves. I have invented a device (which I define as a wave generator) that can be used for this purpose.

Accordingly, it is an object of my invention to generate millimeter and submillimeter waves at relatively high power levels.

Another object is to provide new methods for generating electromagnetic waves.

Still another object is to provide new types of devices for generating electromagnetic waves.

Yet another object is to provide new millimeter and submillimeter wave generators which can generate millimeter and submillimeter waves at relatively high power levels.

A further object is to accelerate electrons in such manner that submillimeter waves are radiated therefrom.

Another object is to compress a large number of electrons into a beam with diameters comparable or smaller than the wavelength of the radiation to be generated.

Still a further object is to provide new millimeter and submillimeter wave generators in which are incorporated means for accelerating electrons in such a manner that millimeter and submillimeter waves are radiated from these electrons.

These and other objects of my invention will either be explained or will become apparent hereinafter.

As is well known to the art, when an electron is accelerated, energy in the form of electromagnetic waves will be radiated therefrom, the radiated power increasing as the magnitude of the acceleration increases.

In accordance with the principles of my invention, a plurality of electrons in an evacuated region of space are compressed into a cylindrical element, the diameter of this element being of the order of the wavelength to be generated or smaller, its axial length being much larger than its diameter. Stated differently, the electrons are compressed into an elongated element of relatively short length and very small cross section; I define such an element as an electron string or thread.

This string is acted upon by magnetic and electric forces in such manner that the ends of the string remain fixed in position and always define the axis of the undeflected string, which I define as the string axis. The portions of the string intermediate its ends curve radially outward from the string axis. The radial displacement between the string and the string axis attains a substantially constant maximum value over a selected region of the string (as for example a region centered about the midpoint of the string) and gradually decreases at each side of the selected region.

Further, the string is caused to vibrate in one or more planes about the string axis in such manner that the path of any point on the string, in a plane containing this point and perpendicular to the string axis, is a cycloidal path. Under these conditions, the electrons [on] the string will be so accelerated as to radiate elect[ro]magnetic waves of extremely short wavelength, as for [ex]ample submillimeter waves.

More particularly, an electron beam, after emissi[on] from a suitable source, is accelerated to a high veloc[ity] and then passes through an evacuated spacial region [to]ward a collector. A radiation chamber positioned in t[his] region is interposed in the path of the beam. A m[ag]netic field is established within the chamber; the magne[tic] field vector pointing in a direction parallel to the be[am] path, and the magnetic field intensity attaining a ma[xi]mum value over a selected region of the beam path a[nd] gradually decreasing along the beam path at each side [of] the selected region. The magnetic field radially co[m]presses the portion of the beam within the chamber. [As] a result of this compression, a high space charge density [is] established within the chamber, the space charge dens[ity] at any point being determined by the magnetic field [in]tensity at this point. Due to this charge density, la[rge] potential gradients are established within the chamb[er]. As the beam enters the chamber, these gradients act up[on] the beam to reduce the beam velocity, the velocity in t[he] region of maximum magnetic field intensity being [ex]tremely low. As the beam leaves the region of maximu[m] intensity, its velocity increases, and the beam pas[ses] through the chamber and travels toward the collector.

The net effect of the magnetic field compression is t[he] formation of the electron string previously described [in] the low beam velocity region within the chamber, t[he] string axis being parallel and substantially coincident w[ith] the beam path.

An electric field is also established within the chamb[er,] the electric field vector pointing in a direction perpe[n]dicular to the direction of magnetic field vector, the el[ec]tric field intensity attaining a maximum value over [at] least a portion of the selected region of the beam path a[nd] gradually decreasing along the beam path at each si[de] of the portion of the selected region. The electric fie[ld] acts upon the electron string to radially displace ea[ch] point on the string (other than the end points of t[he] string) with respect to the string axis. The rate at whi[ch] each point on the string is radially displaced from t[he] string axis is determined by the electric field intensi[ty] at this point, the ends of the string being coincident wi[th] the string axis.

The string, under the influence of both electric a[nd] magnetic fields, is constrained to vibrate in one or mo[re] planes about the string axis in a path at which any poi[nt] on the string, in a plane containing this point and pe[r]pendicular to the string axis, traverses a cycloidal pat[h.] (The electrons in the string are also travelling throu[gh] the chamber toward the collector, but the velocity alo[ng] the path is too small to have any appreciable effect [on] the motion of the string.)

In one application of my invention, the cycloidal pa[th] of any point on the string is such that the cusps of t[he] path define a straight line which intersects a normal [to] both the electric field vector and the magnetic field vect[or] at an acute angle. This type of path is obtained wh[en] an alternating electric field is used; i.e. the electric fie[ld] vector reverses its direction each half cycle, but alwa[ys] remains perpendicular to the string axis.

In a second application, any point on the string describ[es] an epicycloid which lies in a plane perpendicular to t[he] magnetic field vector. This type of path is obtained whe[n] the electric field rotates uniformly in a plane perpend[i]cular to the magnetic field vector; the electric field ve[c]tor continuously rotates about the string axis in a circ[le] yet remains perpendicular to the magnetic field vector.

Illustrative embodiments of my invention will now b[e]

escribed in detail with reference to the accompanying rawings wherein:

Fig. 1 illustrates the action of a magnetic field upon a section of an electron beam;

Fig. 2 illustrates the action of mutually orthogonal electric and magnetic fields upon a section of an electron eam;

Fig. 3 is a cross sectional view of the path traversed y an electron string under the influence of the magnetic nd electric fields of Fig. 2;

Fig. 4 illustrates the curvature of an electron string rotating under the influence of mutually orthogonal magnetic and electric fields, the electric field being a rotating eld;

Fig. 5 is a cross sectional view of the path traversed y an electron string under the influence of the magnetic nd electric fields of Fig. 4;

Fig. 6 is a cross sectional view of a tube constructed in ccordance with the principles of my invention;

Figure 7:
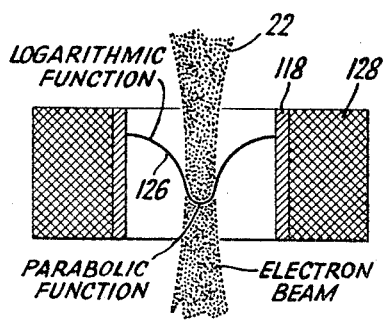
Fig. 7 illustrates in enlarged cross section the potential ariation within the radiation chamber of the tube of ig. 6.

Referring now to Fig. 1, a section 20 of an electron eam having a beam axis 22 is compressed axially by a 1agnetic field having its magnetic field vector $B_0$ pointg in a direction parallel to the axis 22. The magnetic eld intensity attains a substantially constant maximum alue over region $p$ on section 20 and decreases gradually ong the axis 22 at each side of region $p$. In this example, the intensity variation of the magnetic field is presented by a flat topped curve 24.

As will be explained in more detail hereinafter, the ompression effect slows down the electrons in the beam that, in the region of high magnetic field intensity, the ectrons are travelling at an extremely low velocity and re formed into an electron string 26.

Fig. 2 shows the distribution of an applied electric deection field along the string 26. The electric field $E_0$ an alternating field, the electric field vector $E_0$ reversg its direction every half cycle yet always parallel to a lected direction perpendicular to the magnetic field vecr $B_0$. The amplitude of the electric field intensity as presented by curve 28 varies in the same manner as 1e magnetic field intensity. However, it will be apparent that the flat portion of curve 24 is substantially ider than the flat portion of curve 28. Under the inuence of the electric field, the electron string is curved, e ends of the string being coincident with the beam tis and hence defining a string axis. All points on the ring intermediate its ends are radially displaced from e string axis, the radial displacement of each of these termediate points being determined by the electric field tensity at said each point.

Under the combined influence of the electric and magetic fields, the string is constrained to move about the ring axis in such a manner that any point on the string, a plane perpendicular to the string axis which contains .is point, traverses a cycloidal path.

A typical cycloidal path for such a point $R$ is shown Fig. 3. The electric field exerts an electric force on e electrons at rest at $R$ in such a direction that these ectrons start to travel in the direction of the field. As e speed of these electrons increases, the magnetic field erts an increasing magnetic force on these electrons hich is perpendicular both to the magnetic field vector 1d to the instantaneous direction of electron movement. s a result of the influence of both of these forces, the ectrons travel in a cycloidal path 30 having cusps $P_1$, $\ldots P_n$.

Since the magnetic force is always exerted at right angles to the instantaneous direction of electron motion, no energy is transferred between the magnetic field and the electron.

During its first half sector of travel along any arc of path 30, energy is transferred to the electrons from the electric field; during its second half of the sector of travel, energy is transferred from the electrons to the electric field. If the electrons were not to lose energy through radiation during the traversal of each arc, the energy transfer in the first half sector would equal the energy transfer in the second half sector, and the cusps of the path 30 would fall along the dotted line 32 which is perpendicular both to the electric field vector $E_0$ and the magnetic field vector $B_0$.

However, since the electrons are constantly being accelerated, they are constantly radiating energy; this radiated energy is supplied by the electric field. Hence, the energy transferred from the field to the electrons during the first half sector of travel exceeds the energy transferred from the electrons to the field during the second half sector of travel by an amount equal to the radiated energy. As a result, the cusps of path 30 do not fall along the dotted line 32 but rather fall along the solid line 34. Line 34 intersects line 32 at an acute angle $\alpha$.

Since the electric field is an alternating field, the electrons either travel generally from left to right, as indicated by the solid portion of path 30, or from right to left, as indicated by the dotted portion of path 30.

Due to the acceleration of these electrons, energy is radiated in the form of an electromagnetic wave. The wavelength of the radiated wave is inversely proportional to the magnetic field intensity. The tangent of angle $\alpha$ (the angle between line 34 and line 32 which is perpendicular to both the electric and magnetic field vectors) is directly proportional to the magnetic field intensity, and hence is also inversely proportional to the wavelength of the radiated wave. The power radiated is proportional to the product of square of the electric field intensity and the square of the number of electrons. Hence, the wavelength of the radiated wave decreases as the magnetic field intensity increases, while the radiated power increases as the electric field intensity increases.

It will be apparent from a comparison of curves 24 and 28, that the radiated wave has a wavelength determined by the maximum value of the magnetic field intensity; in regions where the magnetic field intensity is less than this maximum value, the electric field intensity is so low that substantially no radiation is produced. If the flat portion of the electric field intensity curve 28 is enlarged, the radiated power will increase, but the radiated wave will be composed of different wavelengths (since radiation will be produced in regions where the electric field intensity is appreciable and the magnetic field intensity is less than its maximum value); in addition the electron string is somewhat distorted and can become somewhat unstable.

The electric field need not be an alternating field but instead can be a circularly polarized field in a plane perpendicular to the magnetic field; i.e. the electric field vector contained in this plane will rotate uniformly, the amplitude of the electric field intensity still varying in the manner shown in Fig. 2. Under these conditions, the string will rotate about the string axis as shown in Fig. 4.

Further, any point on the string, in a plane perpendicular to the string axis and containing this point, traverses a cycloidal path, the cusps of which define a circle as shown in Fig. 5, or expressed differently, any point on the string describes an epicycloid.

The frequency of the electric field rotation is adjusted to be much lower than the frequency of the cycloidal motion. Under these conditions, the time required for $R$ to travel through one full arc of the cycloid is sufficiently short to permit the electric field to be treated as if it were a constant rather than a rotating field. It can be shown that the same wavelength and power considerations apply to the motions shown in Figs. 3 and 5.

In Fig. 5 it will be seen that when the electric field is treated as a constant, as for example represented by the solid vector $E_0$, the tangent drawn through cusp $P_1$, represented by the solid line 34, intersects line 32 (which is perpendicular both to the electric and magnetic field vectors) at an angle $\alpha$; this angle is identical with angle $\alpha$ of Fig. 3.

Fig. 6 shows, in cross section, a tube in which an electron string is produced in the manner previously indicated. An electron gun 100 and 104, for example of the Pierce type, is mounted within an evacuated envelope 102 and produces an electron beam which is accelerated to a high velocity by an acceleration electrode 110. The cathode portion 100 of the gun, the anode portion 104 of the gun and the acceleration electrode 110 are respectively connected to different points of direct potential 106, 108 and 120. Point 120 is at a much higher positive potential than point 106, the difference being on the order of 100,000 volts. Point 108 is also at a higher positive potential than point 106, the difference being on the order of 1000 volts.

The high velocity beam, after passing electrode 104, passes through a first cylinder 110, a radiation chamber 112, and a second cylinder 114, to a collector 116. The radiation chamber, which will be described in more detail hereinafter, includes a third cylinder 118. Cylinders 110, 114 and 118 are all connected to the same point 120 of direct potential, the potential difference between points 106 and 120 being, as mentioned, on the order of 100,000 volts.

Collector 116 includes a collector sleeve 121 connected to point 109, and a repeller ring 122 connected to a point of direct potential 124. The potential difference between points 106 and 124 is on the order of 100 volts, point 124 being at the lower potential. The potential difference between points 106 and 109 is on the order of a few 100 volts, point 109 being at the higher potential.

A magnetic field of the type shown in Fig. 1 is established within the radiation chamber 112 by means of a magnet coil 126 circumferentially mounted about the third cylinder 118.

Due to the axial beam compression within the radiation chamber produced by the interaction of the magnetic field and the electrons in the beam, a sharp potential depression between the beam and the cylinder 118 is established as shown in Fig. 7.

The potential profile of this variation is generated by rotating curve 126 about the axis of the beam, or stated differently, curve 126 shows the potential profile in cross section. In the region between the cylinder wall and the beam periphery, curve 126 describes a logarithmic function; in the region between the beam periphery and the beam axis, curve 126 describes a parabolic function. For the region of highest magnetic field intensity, the potential difference is extremely high, for example, on the order of several hundred thousand volts; the potential difference decreases as the magnetic field intensity decreases.

This strong potential depression caused by the electron space charge density, acts to reduce the velocity of the high velocity electrons flowing through the first cylinder 110; ultimately, the velocity of the electrons, when formed into the electron string, is so reduced that these electrons are practically at standstill. However, as these electrons slowly drift along the beam axis and enter regions of lower magnetic intensity, the space charge density is reduced, and the velocity of the electrons increases. Consequently, the electrons leaving the second cylinder 114 have substantially the same velocity as the electrons entering the first cylinder 110.

As the electrons leave the second cylinder, they are repelled by the repeller ring 122 and strike the collector sleeve 121 with greatly reduced velocity. (If the velocity were not reduced, the tube would still function in t manner indicated, but the power losses due to heating the sleeve would be extremely high. The reduction velocity effectively reduces such losses.)

The radiated wave, as shown in Fig. 6, travels throu ring 122 and through a window 123, mounted in envelo 102 and transparent to this wave, to the outside envelope 102. The wave is then guided in known ma ner by a conventional horn-radiator 125.

Figure 8:
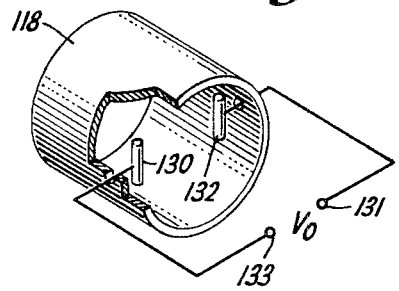
Fig. 8 is a view of the radiation chamber of the tube f Fig. 6.

An electric field of the type shown in Figs. 2 and is established within the chamber by means of two sep rated electrodes 130 and 132 mounted within the thi cylinder 118 in the manner shown in Fig. 8, the alterna ing voltage $V_0$ required to produce the field being a plied between terminals 131 and 133.

Figure 9:
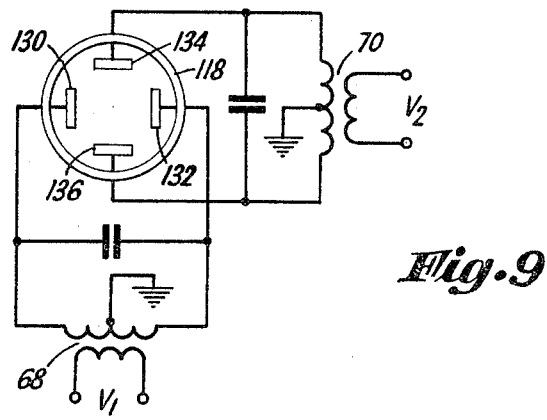
Fig. 9 shows a modification of the radiation chamber 10wn in Fig. 8.

In order to use an electric field of the type describe in Figs. 4 and 5, the arrangement shown in Fig. 8 ca be augmented as shown in Fig. 9 by the insertion of tw additional separated electrodes 134 and 136. A fir voltage $V_1$ is applied through transformer 68 betwee plates 130 and 132 and a second voltage $V_2$ is applie through transformer 70 between plates 134 and 13 Voltages $V_1$ and $V_2$ are alternating voltages having th same frequency and amplitude but displaced in phase b 90° relative to each other. This apparatus, as is we known to the art, establishes a circularly polarized ele tric field within the radiation chamber.

Figure 10:
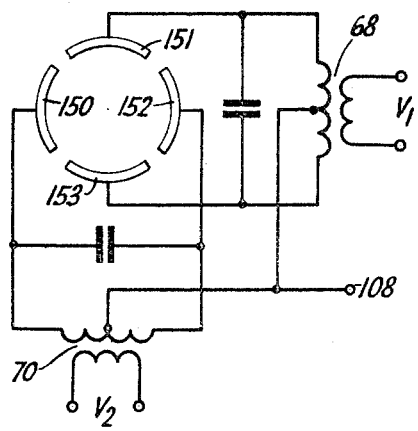
Fig. 10 shows another modification of the radiation 1amber shown in Fig. 8.

Fig. 10 shows a variation of the device shown in Fig. wherein the cylinder 110 and the electrodes 130, 132, 13 and 136 are structurally combined; in Fig. 10 the cylir der 118 is divided into four segments 150, 151, 152 an 153. The direct potential point 108 is applied to a segments. Appropriate alternating voltages are applie to the segments in the same manner as in Fig. 9, seg ments 150 and 152 being connected as electrodes 13 and 132 and segments 151 and 153 being connected a electrodes 134 and 136.

If desired, the cylinder 118 or segments 150, 15] 152 and 153 can be perforated, and if the magnet co: is split into two or more coil sections separated by gap which are in registration with the perforations, the radi ated wave can travel through the perforations to the outside of the envelope 102 in a direction perpendicula to the string axis and gap.

While I have shown and pointed out my invention a applied above, it will be apparent to those skilled in th art that many modifications can be made within the scop and sphere of my invention as defined in the claim which follow.

What is claimed is:

1. In a wave generator, a radiation chamber, a plu rality of electrons moving in said chamber along a giver path; means to establish a magnetic field within saic chamber, the magnttic field vector pointing in a direction parallel to said path, the magnetic field intensity havin; a maximum value over a selected region of said patl and decreasing along said path on opposite sides of saic selected region, said magnetic field compressing said mov ing electrons into an electron string having a string axi: parallel to said magnetic field vector; and means to estab lish an electric deflection field within said chamber, the electric field vector pointing in a direction perpendicula to the magnetic field vector, the electric field intensity having a maximum value over at least a portion of saic selected region and decreasing along said path on oppo site sides of said portion of said selected region, saic electric field acting upon said string to radially displace each point on said string intermediate its ends from saic string axis, the rate at which said each point is radiall) displaced from the string axis being determined by the electric field intensity at said point, the ends of said strinf being coincident with the string axis, said string undei the influence of both fields, being constrained to move about the string axis in a path at which any point or said string, in a plane perpendicular to the string axis and containing said any point, traverses a cycloidal path.

2. In a wave generator, a radiation chamber, a plurality of electrons moving in said chamber along a given path; means to establish a magnetic field within said chamber, the magnetic field vector pointing in a direction parallel to said path, the magnetic field intensity having a maximum value over a selected region of said path and decreasing along said path on opposite sides of said selected region, said magnetic field compressing said moving electrons into an electron string having a string axis parallel to said magnetic field vector; and means to establish an electric deflection field within said chamber, the electric field vector pointing in a direction perpendicular to the magnetic field vector, the electric field intensity having a maximum value over at least a portion of said selected region and decreasing along said path on opposite sides of said portion of said selected region, said electric field acting upon said string to radially displace each point on said string intermediate its ends from said string axis, the rate at which the radial displacement of said each point occurs being determined by the electric field intensity at said point, the ends of said string being coincident with the string axis, said string under the influence of both fields, being constrained to move about the string axis in a path at which any point on said string, in a plane perpendicular to the string axis and containing said any point, traverses a cycloidal path, the electrons of said any point radiating energy in the form of an electromagnetic wave, the wavelength of said wave being inversely proportional to the maximum value of said magnetic field intensity, the power of said radiated wave being approximately proportional to the product of the square of the number of electrons contained in the portion of said electron string contained in said portion multiplied by the square of the electric deflection field intensity in said portion.

3. In a wave generator, a radiation chamber, a plurality of electrons moving in said chamber along a given path; means to establish a magnetic field within said chamber, the magnetic field vector pointing in a direction parallel to said path, the magnetic field intensity having a maximum value over a selected region of said path and decreasing along said path on opposite sides of said selected region, said magnetic field compressing said moving electrons into an electron string having a string axis parallel to said magnetic field vector; and means to establish an alternating electric field within said chamber, the electric field vector always pointing in a direction perpendicular to the magnetic field vector, the electric field intensity having a maximum value over at least a portion of said selected region and decreasing along said path on opposite sides of said portion of said selected region, said electric field acting upon said string to radially displace each point on said string intermediate its ends from said string axis, the maximum radial displacement of said each point being determined by the amplitude of the electric field intensity at said point, the ends of said string being coincident with the string axis, said string under the influence of both fields, being constrained to move about the string axis in a path at which any point on said string, in a plane perpendicular to the string axis and containing said any point, traverses a cycloidal path, the cusps of said path defining a straight line.

4. In a wave generator, a radiation chamber, a plurality of electrons moving in said chamber along a given path; means to establish a magnetic field within said chamber, the magnetic field vector pointing in a direction parallel to said path, the magnetic field intensity having a maximum value over a selected region of said path and decreasing along said path on opposite sides of said selected point, said magnetic field compressing said moving electrons into an electron string having a string axis parallel to said magnetic field vector; and means to establish an electric circularly polarized field within said chamber, the electric field vector always pointing in a direction perpendicular to the magnetic field vector, the amplitude of the electric field intensity having a maximum value over at least a portion of said selected region and decreasing along said path on opposite sides of said selected region, said electric field acting upon said string to radially displace each point on said string intermediate its ends from said string axis, the radial displacement of said each point being determined by the amplitude of the electric field intensity at said point, the ends of said string being coincident with the string axis, said string under the influence of both fields, being constrained to move about the string axis in such a manner that any point on said string describes an epicycloid in a plane perpendicular to the string axis.

References Cited in the file of this patent
UNITED STATES PATENTS

| | | |
|---|---|---|
| 2,158,114 | Fritz | May 16, 1939 |
| 2,233,779 | Fritz | Mar. 4, 1941 |
| 2,306,875 | Fremlin | Dec. 29, 1942 |
| 2,404,417 | Varela | July 23, 1946 |
| 2,409,179 | Anderson | Oct. 15, 1946 |
| 2,409,608 | Anderson | Oct. 15, 1946 |
| 2,414,121 | Pierce | Jan. 14, 1947 |
| 2,424,965 | Brillouin | Aug. 5, 1947 |
| 2,438,954 | Towns | Apr. 6, 1948 |
| 2,634,372 | Salisbury | Apr. 7, 1953 |
| 2,730,648 | Lerbs | Jan. 10, 1956 |
| 2,745,039 | Bowen | May 8, 1956 |